Aug. 15, 1939.   L. SEVEK   2,169,905
INTESTINE-CLEANING MECHANISM
Filed Sept. 28, 1936

Inventor
Louis Sevek
By Arthur H. Sturges
Attorney

Patented Aug. 15, 1939

2,169,905

UNITED STATES PATENT OFFICE 2,169,905

INTESTINE-CLEANING MECHANISM

Louis Sevek, Omaha, Nebr.

Application September 28, 1936, Serial No. 102,826

4 Claims. (Cl. 17—43)

This invention relates to the meat packing industry and more particularly to the intestine or gut cleaning art and has for an object to provide means whereby slime and debris may be expeditiously and economically removed from the intestines of animals and particularly steers whereby said intestines may be readily cleaned for use as casings for sausage meats and the like.

It is an object of the invention to provide means for the above stated purposes which is certain of operation during handling of all conventional sizes of intestines and a removal therefrom of lumpy quantities of spaced apart debris encountered throughout the length of an intestine.

It is a further object of the invention to provide a machine for the above stated purposes, the parts of which are so arranged that guts when fed into one end of the machine will automatically go through the machine and the parts thereof without injury whereby the guts can subsequently be used for meat encasing purposes.

Other and further objects and advantages of the invention will be understood from the following detailed description thereof, reference being had to the accompanying drawing in which.

Figures 1, 2, 3:
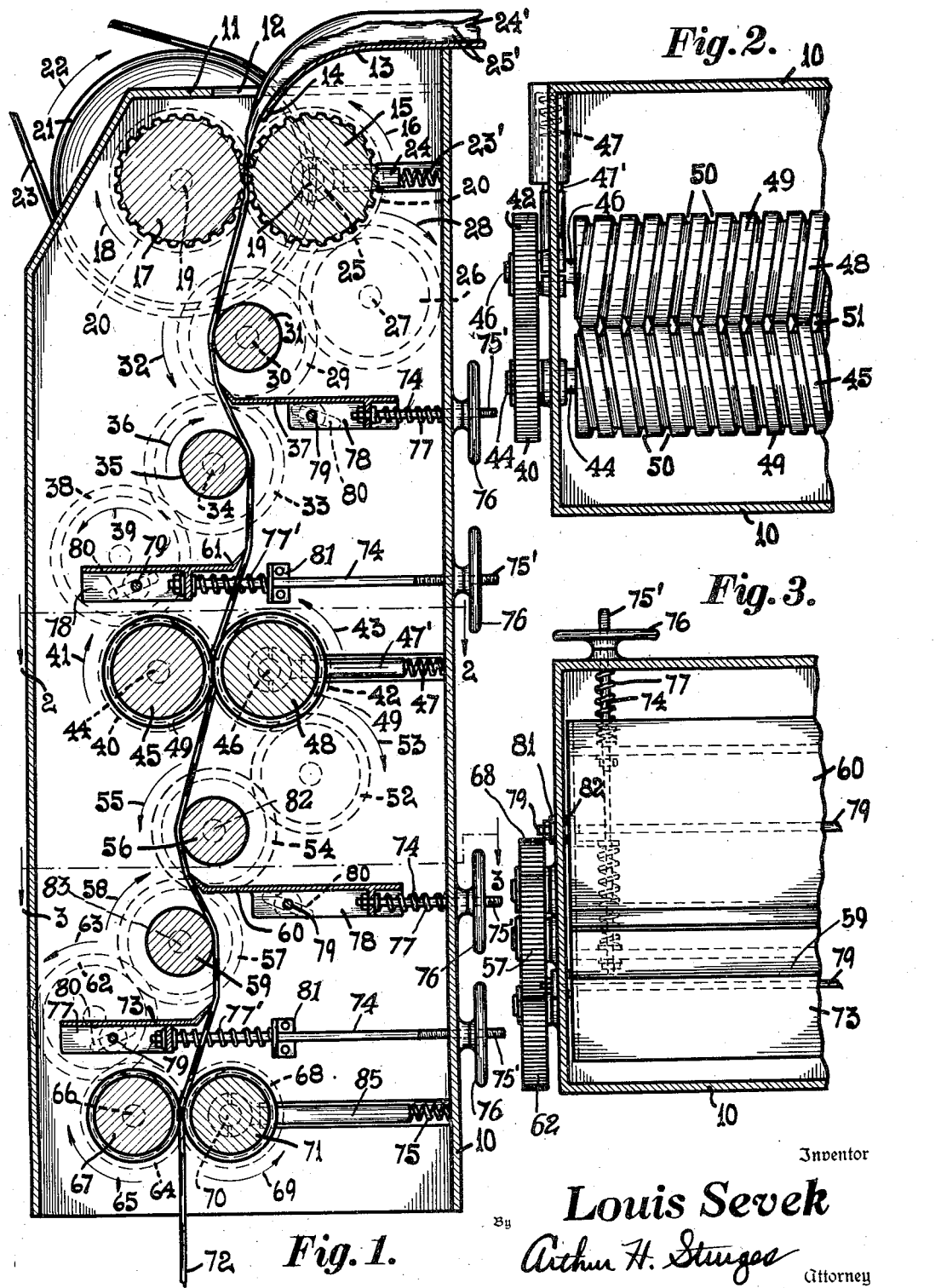
Figure 1 is a vertical section of the new machine.
Figure 2 is a transverse section of a fragment thereof taken substantially on line 2—2 of Figure 1.
Figure 3 is a view similar to Figure 2, but taken on line 3—3 of Figure 1.

Referring now to the drawing for a more particular description, 10 indicates a housing or frame having an open bottom and a top 11 provided with an aperture 12 through which the elongated guts are passed longitudinally into the interior of the housing or within the frame.

A curved guide plate 13 is carried by the top of the machine and extends inwardly of the aperture 12 providing a platform for purposes later described.

The curved guide 13 has an end 14 positioned closely adjacent to the oppositely disposed perimeters of a pair of rollers having corrugated or fluted surfaces, said flutes extending longitudinally of said rollers. The fluted roller 15 revolves in the direction of the arrow 16 and the roller 17 revolves in the direction of the arrow 18, whereby said rollers revolve in opposite directions. It will be understood that all or any of the rollers mentioned herein may be mounted on stub-axles attached to the ends of the rollers, said axles each extending through an adjacent side wall of the housing 10 as indicated by the dotted line representations thereof shown in Figure 1 and that, if desired, a shaft which extends axially through each roller may be employed in lieu of two stub-axles for each roller. The shafts or stub-axles 19 of the rollers 15 and 17 are each provided with a driver pinion 20, the teeth of which are constantly in mesh, one of said shafts being also provided with a pulley wheel 21 which is driven in the direction of the arrow 22 by means of a belt 23, the latter receiving its motion from a pulley, not shown, driven by any suitable source of power, such as an electrical motor or the like for providing the squeezing rollers 15 and 17 with revoluble movements. Said rollers are normally in contact with each other at all times, except at times when intestines are passing between the rollers. The roller 15 is normally urged towards the roller 17 at all times by means of like springs 23' disposed at opposite ends of the roller 15, said springs each urging their respective shaft 24 towards the roller 17, each of said shafts 24 terminating in a split eye 25 which substantially encircles the shaft 19 of the roller 15 for said purpose. The shaft 19 or stub-axles of the roller 15, together with the shafts or stub-axles of later mentioned rollers 48 and 71 are loosely journalled through opposite side walls of the housing 10 in order to permit slight sliding movements of said rollers transversely with respect to their length.

The operator may take an intestine having debris or slime within it and feed an end of said intestine manually towards the rollers 15 and 17 until said end becomes gripped between said rollers; whereupon the intestine is drawn inwardly of the housing 10 and between said rollers and as said intestine 24' passes downwardly said slime 25' becomes squeezed or forced upwardly of the intestine and outwardly of the machine, as shown in Figure 1, the operator at said time holding the intestine over the curved guide plate 13 for stretching the intestine and facilitating said operation.

There is an idler pinion 26 which is in mesh at all times with the pinion 20 of the roller 15, said pinion 26 being carried on an outer side of the frame by its axle 27. The pinion 26 is driven in the direction of the arrow 28 for communicating motion to a pinion 29 which is mounted on an outer end of a shaft stub-axle 30, the latter being disposed transversely of the frame 10. The shaft 30 is keyed or otherwise suitably secured to a roller 31 which revolves and is driven in the direction of the arrow 32, said roller 31 being positioned directly below the abutting perimeters of the rollers 15 and 17, and as said end of the intestine is moved towards the roller 30 by the rollers 15 and 17 and in contact therewith the direction of travel of the roller 31 causes said end to become moved correspondingly to one side of the roller 31 as illustrated in Figure 1, as the intestine is moved further downwardly by the rollers 15 and 17.

There is a pinion 33 affixed to a shaft or stub axle 34 of a further guide roller 35, the latter revolving in the direction of the arrow 36 or in an opposite direction with respect to the guide roller 31, said pinion 33 being in mesh at all times with the pinion 29. The direction of rotation of the pinion 35 causes said end of the intestine to become positioned correspondingly at that side of the roller 35 as shown in Figure 1, as said end of the intestine moves downwardly of the housing.

Between the rollers 35 and 31 a scraping knife 37 is positioned, the function and operation thereof being later described and the rollers 35 and 31 are so positioned with respect to each other and with respect to the scraping edge of said knife that the intestine is pressed against said edge during the downward travel of the intestine.

The pinion 33 is in mesh at all times with an idler pinion 38 which revolves in the direction of the arrow 39. The pinion 38 drives a pinion 40 in the direction of the arrow 41. The pinion 40 is in mesh at all times with a similar pinion 42 which is thereby driven in the direction of the arrow 43. The shaft 44 of the pinion 40 extends through the side walls of the frame 10 and a squeezing roller 45 is carried on said shaft. The shaft 46 of the pinion 42 is normally urged towards the shaft 44 of the roller 45 by means of like springs 47 which are disposed at opposite ends of the shaft 46, said springs 47 being similar in operation and construction with respect to the heretofore mentioned springs 23'.

The shaft 46 carries a squeezing roller 48. The rollers 45 and 48 are preferably formed of rubber as are also the fluted or corrugated rollers 17 and 15. The peripheries of the rollers 45 and 48 are provided with square threads 49 as best shown in Figure 2. The threads 49 of the rollers 45 and 48 are urged towards each other by means of like springs 47. The springs 47 urge their respective shafts 47' toward the roller 45, split eyes being provided at the ends of the shafts 47' which approximately encircle the shaft 46 of the roller 48. The recesses 50 between the threads of the rollers 45 and 48 provide apertures 51, as shown in Figure 2, between said rollers which facilitate squeezing slime from the intestine without rupturing the walls of the latter. The pitch of the thread of the roller 45 extends helically in an opposite direction with respect to the thread of the roller 48. The pinions 40 and 42 are of smaller diameter than the pinions of the rollers 15 and 17 and said rollers are of larger diameter than the rollers 45 and 48, the arrangement of gearing being such that the peripheries of the squeezing rollers 45 and 48 are driven faster than the peripheries of the rollers 15 and 17 for stretching gut portions while therebetween for aiding the operation of the scraping knives.

There is an idler pinion 52 in mesh at all times with the pinion 42 of the roller 48. The pinion 52 is driven in the direction of the arrow 53 and functions to drive a pinion 54 in the direction of the arrow 55. The stub-axle 82 or shaft of the pinion 54 carries a guide roller 56 which functions similar to the guide roller 31 for causing the downwardly moving end of the gut 24' to be moved correspondingly upon contact with the roller 56 and to that side of the roller as shown in Figure 1. The pinion 54 is in mesh with a driven pinion 57 which revolves in the direction of the arrow 58. The stub-axle 83 or shaft of the pinion 57 carries a guide roller 59 which revolves in an opposite direction with respect to the roller 56. The rollers 56 and 59 cooperate for causing the gut 24' to contact with the adjacent edge of a scraping knife.

Between the guide rollers 59 and 56 a second scraping knife 60 is provided which functions similar to the heretofore mentioned scraping knife 37. A similar scraping knife 61 is disposed between the guide roller 34 and the slime removing or squeezing rollers 45 and 48, said knives being more particularly described later herein.

The pinion 57 of the guide roller 59 is in mesh at all times with an idler pinion 62 which is driven in the direction of the arrow 63. The idler 62 communicates motion to a pinion 64, driving the latter in the direction of the arrow 65. The shaft or stub-axle 66 of the pinion 64 is provided with a squeezing roller 67 formed preferably of rubber and provided with threads, said roller being similar to the heretofore described roller 45 except that it is of smaller diameter.

The pinion 64 drives an oppositely disposed pinion 68 in the direction of the arrow 69, the shaft or stub-axle 70 of the pinion 68 being provided with a squeezing roller 71 which is similar to the roller 48 shown in Figure 2 except as to the diameter thereof. The diameters of the squeezing rollers 67 and 71 are each less than the diameter of the squeezing rollers 45 and 48 and the arrangement of gear ratio is such that the squeezing rollers 67 and 71 revolve faster than the squeezing rollers 45 and 48 for stretching gut portions therebetween and causing said portions to be pressed against certain later more particularly described scraping knives.

The roller 71 is normally urged towards the roller 67 at all times by means of like springs 75 disposed at opposite ends of the shaft 70. The springs 75 urge their respective shafts 85 toward the roller 67 and the shafts 85 are provided with split eyes which approximately encircle the roller shaft 70 adjacent opposite ends of the latter.

As an intestine 24' is passed downwardly and through the machine it is squeezed between the sets of squeezing rollers for moving the slime upwardly through the intestine while at the same time the outer surfaces of the intestine become scraped by means of the knives 37, 60, 61 and 73 for removing otherwise adhering debris therefrom.

The scraping knives may be adjusted towards or away from the intestine 24', said knives extending transversely across the interior of the housing or frame 10 as shown in Figure 3.

The end 72 of the intestine after passing through the machine and from between the lowermost and fastest moving squeezing rollers, together with the balance of the intestine 24' as the latter moves outwardly of the machine, is suitably and manually disposed of.

For each push-pull knife a shaft 74 is provided, the inner ends thereof being secured to the knives. The other ends of the push-pull shafts 74 extend through a common wall of the machine and are provided with threads 75' for cooperation with wing nuts 76 disposed thereon, and it will be understood that by rotating said wing nuts the knives may be adjustably moved toward or away from the intestine 24', and that, at times when a portion of an intestine having an abnormal amount or a lump of debris therein approaches and comes in contact with a knife, the latter may be automatically moved away from the intestine by said lump, and against the urge of the knife springs 77 for the knives 37 and 60, said springs 77 being of expanding type and against the urge of the springs 77' for the knives 61 and 73, said springs 77' being of contracting type and each having an end secured to a knife and an opposite end secured to a suitable detent 81 carried by the machine, the detents for the ends of the contracting springs 77' also providing guides for their shafts 74, the latter extending through said detents 81 as shown in Figure 1.

The knives are provided with oppositely disposed side flanges 78, as shown in Figure 1, through which rods 79 extend, said rods also extending through and being supported by the side walls of the frame 10. The rods 79 project through elongated, suitably inclined apertures 80 formed through oppositely disposed side walls of the housing 10, whereby at times when a knife is urged or moved towards the intestine 24' by a manipulation of a wing nut 76 the shaft 79 of the knife moved slides upwardly of its elongated apertures 80, being guided by the walls of said apertures and at times when a lumpy portion of an intestine contacts with a scraping edge of a knife said edge is forced downwardly and away from the intestine quickly for preventing a fracture of the latter.

As best shown in Figure 3, the outer ends of the shafts 79 may be provided with guide washers 81 on the exterior of the frame 10 and with guide washers 82 on the interior thereof, whereby adjacent portions of the frame 10 are disposed between the guide washers 81 and 82.

The scraping edges of the knives are preferably inclined upwardly of the machine and pointed toward the approaching and downwardly traveling portions of an intestine stretched between the adjacent rollers.

The higher or first set of squeezing rollers 15 and 17 also function to flatten or break up lumps of debris within an intestine into smaller portions as well as to move an intestine downwardly and through the machine. The guide stretching rollers being off-set with respect to each other also aid in removing slime from an intestine. The square threaded rollers provide a space between the oppositely disposed threads of opposite rollers in which a gut portion having a lump of debris therein may retire while the lump is gradually rolled out of said portion by contact of the latter with an edge of an abutting thread thus cleaning a gut without rupturing the stretchable wall thereof.

After cleaning and scraping as above described the guts are further treated by extraneous means and methods prior to a use of the cleaned guts as a sausage jacket or casing. Three sets of squeezing rollers and four scraping knives are sufficient for cleaning all conventional guts; however, further rollers and knives may be added or a lesser number than herein described. The rollers cooperate to flatten the guts transversely as they pass through the machine for presenting said flattened portions of the guts to the scraping knives.

Preferably two scraping knives are provided between spaced apart pairs of squeezing rollers and arranged to scrape opposite sides of a flattened gut simultaneously as shown in Figure 1.

It is obvious that various changes and modifications may be made in the details of construction and design of the above specifically described embodiment of this invention without departing from the spirit thereof, such changes and modifications being restricted only by the scope of the invention as claimed.

What is claimed is—

1. An intestine cleaning device comprising a frame, a pair of opposed squeezing rollers carried by said frame and provided with longitudinally extending corrugations, spring-pressed means constantly urging one of said rollers toward the other roller, means connecting said rollers together for rotation in opposite directions, a second pair of spring-pressed pulling rollers carried by said frame, said second pair of rollers being formed of rubber and provided with helically disposed grooves, gear means connecting said second rollers with said first rollers for rotation at a peripheral speed greater than said first rollers whereby the intestine will be stretched between said pairs of rollers, and a pair of vertically spaced apart outer surface cleaning blades carried by said frame between said pairs of rollers, said blades being disposed in different vertical planes and in planes offset from the plane of the meeting line of said pairs of rollers whereby the taut intestine will be forcibly moved across said blades.

2. An intestine cleaning device comprising a frame, a pair of opposed longitudinally grooved squeezing rollers carried by said frame and formed of a resilient material, spring-pressed means constantly urging one of said rollers toward the other roller, means connecting said rollers together for rotation in opposite directions, a second pair of spring-pressed pulling rollers carried by said frame, said second pair of rollers being formed of a resilient material and having helically disposed grooves, gear means connecting said second rollers with said first rollers for rotation at a peripheral speed greater than said first rollers whereby the intestine will be stretched in a straight line between said pairs of rollers, and a pair of vertically spaced apart outer surface cleaning blades carried by said frame between said pairs of rollers, said blades being disposed in different vertical planes and in planes offset from the plane of the meeting line of said pairs of rollers whereby the taut intestine will be forcibly moved across said blades.

3. An intestine cleaning device comprising a frame, a pair of opposed squeezing rollers carried by said frame and formed of a resilient material and having longitudinally extending grooves in their periphery, means connecting said rollers together for rotation in opposite directions, a second pair of spirally grooved spring-pressed pulling rollers carried by said frame and formed of a resilient material, gear means connecting said second rollers with said first rollers for rotation at a peripheral speed greater than said first rollers whereby the intestine will be stretched between said pairs of rollers, and a pair of vertically spaced apart outer surface cleaning blades carried by said frame between said pairs of rollers, said blades being disposed in different vertical planes and in planes offset from the plane of the meeting line of said pairs of rollers whereby the taut intestine will be forcibly moved across said blades.

4. An intestine cleaning device comprising a frame, a pair of opposed squeezing rollers carried by the frame, means for rotating said rollers in opposite directions, a second pair of squeezing rollers each having a helical thread and grooves between said threads, the grooves of one of said second pair of rollers cooperating with the grooves of the other of said second pair of rollers to provide recesses for the reception of a gut portion having a lump of debris therein while the lump is gradually rolled out of said portion by contact of the lump with an edge of an abutting thread, thereby cleaning the gut portion without rupturing the wall thereof, and means for rotating said second pair of rollers in opposite directions.

LOUIS SEVEK.